US006156807A

United States Patent
Kaitou et al.

[11] Patent Number: 6,156,807
[45] Date of Patent: Dec. 5, 2000

[54] POWDERED EMULSIFIER COMPOSITION AND PROCESS FOR PRODUCING THE SAME

[75] Inventors: Mitsumasa Kaitou; Junji Hamano, both of Yokkaichi, Japan

[73] Assignee: Mitsubishi Chemical Corporation, Tokyo, Japan

[21] Appl. No.: 09/158,712

[22] Filed: Sep. 22, 1998

[30] Foreign Application Priority Data

Sep. 24, 1997 [JP] Japan ................................. 9-258454

[51] Int. Cl.⁷ ..................... B01F 3/08; B01F 17/00; C09K 3/00
[52] U.S. Cl. .................. 516/70; 516/69; 516/73; 516/915; 516/918
[58] Field of Search ................... 516/70, 69, 73, 516/915, 918

[56] References Cited

U.S. PATENT DOCUMENTS

| | | | |
|---|---|---|---|
| 4,161,459 | 7/1979 | Otsuka et al. | 252/352 |
| 4,849,132 | 7/1989 | Fujita et al. | 252/356 |
| 5,080,828 | 1/1992 | Terae | 252/358 |
| 5,274,079 | 12/1993 | Katayama et al. | 530/372 |
| 5,378,484 | 1/1995 | Suwa et al. | 426/329 |
| 5,409,728 | 4/1995 | Itagaki et al. | 426/607 |
| 5,637,337 | 6/1997 | Ueda et al. | 426/329 |
| 5,773,073 | 6/1998 | Matsuda et al. | 426/602 |

FOREIGN PATENT DOCUMENTS

| | | |
|---|---|---|
| 2 656 235 | 6/1991 | France . |
| 404354528A | 12/1992 | Japan . |

OTHER PUBLICATIONS

XP–00208876, Jun. 1994, Derwent Publications Ltd., London, GB.

XP–00208877, Oct. 1984, Derwent Publications Ltd., London, GB.

*Primary Examiner*—Maureen M. Wallenhorst
*Assistant Examiner*—Monique T. Cole
*Attorney, Agent, or Firm*—David G. Conlin; Lisa Swiszcz Hazzard; Dike, Bronstein, Roberts & Cushman, LLP

[57] ABSTRACT

A powdered emulsifier composition of the present invention comprises 5 to 90% by weight of a wax-like emulsifier and 95 to 10% by weight of a powdery emulsifier. Such a powdered emulsifier composition is improved in handling property unlike was-like emulsifiers.

6 Claims, No Drawings

POWDERED EMULSIFIER COMPOSITION AND PROCESS FOR PRODUCING THE SAME

BACKGROUND OF THE INVENTION

The present invention relates to a powdered emulsifier composition and a process for producing the composition, and more particularly, to a powdered emulsifier composition which is improved in handling property unlike wax-like emulsifiers, and a process for producing such a composition.

In the production of, for example, flour-based foods, calcium-containing milk, coffee beverages, chocolate or the like, there have been used, as modifying agents or emulsifiers, polyglycerol fatty acid esters, sorbitan monostearate, sorbitan monopalmitate, fatty acid esters of glycerol lactate, fatty acid esters of glycerol citrate, fatty acid esters of glycerol succinate, propylene glycol fatty acid esters, fatty acid esters of glycerol tartrate, sucrose stearate, and sucrose palmitate.

These emulsifiers have been provided in the form of powder, wax, paste, liquid or flakes (refer to (1) "Codex of Food Additives, reprinted by Ministry of Health and Welfare, 6th edition", pp. 228–229, 333, 347, 453 and 528, published by Japan Food Additive Association, Aug. 31, 1992; and (2) "Interpretation of Codex of Food Additives, 5th edition", p. D-260, Jan. 23, 1987, published by Hirokawa Shoten).

Wax-like emulsifiers such as polyglycerol fatty acid esters, organic acid monoglycerides or sucrose unsaturated fatty acid esters have been usually marketed in the form of blocks. Upon use, a required amount of the wax-like emulsifier is typically cut from the blocks, and added, mixed or heat-melted in food.

Although it is possible to pulverize the wax-like emulsifier blocks into powder at a low temperature by, for example, a freeze-pulverizing method, the obtained powder is readily agglomerated when held at room temperature and returned again to a block shape. This makes it difficult to handle the emulsifier. In addition, these emulsifier blocks are disadvantageously deposited inside grinding apparatuses or conduits, thereby deteriorating an operability thereof.

As conventional methods of powdering the wax-like emulsifier, there are known a method of mixing and kneading the wax-like emulsifier with an aqueous solution containing saccharides such as fructose, xylose, maltose, sucrose, mannitol or xylitol to coat the surface of the emulsifier with these saccharides; a method of spraying an aqueous saccharide solution onto the emulsifier, followed by drying, to coat the surface of the emulsifier with saccharides. However, these methods have problems such as prolonged drying time, occasionally formation of agglomerates by the saccharide solution and strong moisture absorption, which are disadvantageous in storing the emulsifier.

As a result of the present inventor's earnest studies to solve the above problem, it has been found that by mixing a wax-like emulsifier with a powdery emulsifier and pulverizing the mixture, a powdered emulsifier composition can be readily obtained, and the obtained powdered emulsifier composition is easy to handle and can be kept stable for a long period of time without agglomeration thereof. The present invention has been attained on the basis of the above finding.

SUMMARY OF THE INVENTION

It is an object of the present invention to provide a powdered emulsifier composition which is improved in handling property and a process for producing such a composition.

To attain the above aim, in a first aspect of the present invention, there is provided a powdered emulsifier composition comprising 5 to 90% by weight of a wax-like emulsifier and 95 to 10% by weight of a powdery emulsifier.

In a second aspect of the present invention, there is provided a process for producing a powdered emulsifier composition defined in the first aspect of the present invention, which comprises melting and mixing the wax-like emulsifier and the powdery emulsifier, followed by cooling and solidifying the obtained mixture, and pulverizing the solidified mixture.

In a third aspect of the present invention, there is provided a process for producing a powdered emulsifier composition defined in the first aspect of the present invention, which comprises mixing the wax-like emulsifier with the powdery emulsifier at a temperature of not more than 40° C. at which both the wax-like emulsifier and powdery emulsifier can be kept in a solid state, and pulverizing the obtained mixture.

DETAILED DESCRIPTION OF THE INVENTION

The present invention is described in detail below.

The powdered emulsifier composition according to the present invention has such a structure that at least a part of the surface of the powdered emulsifier composition is constituted (formed) by powdery emulsifier. Concretely, the powdered emulsifier composition according to the present invention has such a structure that the powdery emulsifier is adhered on the surface of the particle of the wax-like emulsifier and/or has such a structure that the powdery emulsifier is exposed at the surface of the particle of the powdered emulsifier composition.

Wax-like emulsifier:

As the wax-like emulsifiers, there may be used emulsifiers which have no clear crystalline structure and can be melted at a temperature of more than 40° C. and not more than 150° C., such as polyglycerol fatty acid esters, organic monoglycerides or paste-like lecithin; emulsifiers which have a crystalline structure and a melting point of not more than 40° C., and are, therefore, melted by heat generated upon pulverization thereof so that it becomes difficult to pulverize the emulsifier into a powder, such as esters of sucrose and specific fatty acids or sorbitan fatty acid esters. Some Specific examples of the above-mentioned "specific fatty acids" may include unsaturated fatty acids or lauric acid. These wax-like emulsifiers are commercially available in the form of blocks (masses).

As the wax-like emulsifiers having no clear crystalline structure, there may be exemplified (i) polyglycerol fatty acid esters composed of glycerol having a degree of polymerization of 2 to 15 and at least one fatty acid selected from saturated fatty acids such as behenic acid, stearic acid, palmitic acid, myristic acid, capric acid or lauric acid, and unsaturated fatty acids such as oleic acid or erucic acid; (ii) propylene glycol fatty acid esters; (iii) fatty acid esters of glycerol diacetyl tartrate; or the like. As the wax-like emulsifiers having a crystalline structure and a melting point of not more than 40° C., there may be exemplified sucrose oleate, sucrose laurate, sorbitan oleate, sorbitan erucate, sorbitan laurate. Among these compounds, polyglycerol fatty acid esters which have no crystalline structure and can be melted (liquefied) at a temperature of 60 to 120° C., are preferred.

Powdery emulsifier:

As the powdery emulsifiers, there are preferably used those emulsifiers which are kept in a dry state at ordinary temperature of 20 to 40° C., have a particle diameter of 10 $\mu$m to 5 mm and are prevented from being melted or decomposed when heated at a temperature of not more than 45° C.

Specific examples of the powdery emulsifiers may include esters of sucrose with specific fatty acids, esters of sorbitan with specific fatty acids, calcium stearoyl lactate, calcium carboxymethyl cellulose, sodium carboxymethyl cellulose, glycine, casein, sodium caseinate or the like. Specific examples of the above-mentioned "specific fatty acids" may include myristic acid, palmitic acid, stearic acid and behenic acid. These fatty acids can be used singly or in the form of a mixture of any two or more thereof. Among these powdery emulsifiers, sucrose fatty acid esters, sorbitan fatty acid esters and glycine are preferred, and sucrose fatty acid esters are more preferred.

As the powdery emulsifiers, there can also be used commercially available emulsifier particles themselves which have a particle diameter of 10 $\mu$m to 5 mm. Alternatively, upon use, these powdery emulsifiers may be passed through a sieve or pulverized, if necessary, to obtain particles having a particle size of 1 $\mu$m to 3 mm.

Powdered emulsifier composition:

The powdered emulsifier composition according to the present invention comprises 5 to 90% by weight, preferably 10 to 80% by weight, more preferably 40 to 70% by weight of the wax-like emulsifier and 95 to 10% by weight, preferably 90 to 20% by weight, more preferably 60 to 30% by weight of the powdery emulsifier, and has a particle size of 10 $\mu$m to 5 mm at a temperature of 20 to 35° C.

The powdered emulsifier composition according to the present invention can be used in application such as producing chocolate, confectioneries such as langues de chats or pudding, and coffee beverages. That is, the powdered emulsifier composition is mixed with powdered cacao beans, and the mixed powder is heated melted, and is then cooled and solidified to produce chocolate; the powdered emulsifier composition is mixed with a mixture such as wheat flour, sugar, and after further adding water and milk thereto, the obtained mixture is kneaded and then baked to produce confectioneries such as langues de chats or pudding; or the powdered emulsifier composition is also blended with beverages components such as coffee extract, sweetening agent, perfume, and with water to produce coffee beverages.

Production of powdered emulsifier composition:

As methods of producing the powdered emulsifier composition according to the present invention, there may be exemplified (1) a method of melting the wax-like emulsifier and the powdery emulsifier together, followed by cooling, solidifying and pulverizing; (2) a method of mixing and pulverizing the wax-like emulsifier and the powdery emulsifier at a temperature of not more than 40° C. at which both the emulsifiers can be kept in a solid state; and (3) a method of mixing and pulverizing the wax-like emulsifier and the powdery emulsifier under a low-temperature condition.

More specifically, in the method (1), after the wax-like emulsifier and the powdery emulsifier are melted and mixed with each other at a temperature not less than melting points of both the emulsifiers (for example, 60 to 150° C.), the molten mixture is cooled and solidified to form a solid. The obtained solid is preliminarily cut into lumps of several centimeters cube, if required, and then pulverized into particles (powder-like) having a particle size of 10 $\mu$m to 5 mm. As the cooling and solidifying method, there can be used any method such as natural cooling, belt cooler method, drum cooler method.

In the method (2), the wax-like emulsifier and the powdery emulsifier are charged into a mill and pulverized therein while kept at room temperature. In the method (3), the wax-like emulsifier is frozen at a temperature not more than solidification point thereof and mixed with the powdery emulsifier, and the obtained mixture was charged into a mill and pulverized into particles (powder-like) having a particle size of 10 $\mu$m to 5 mm. The freeze-solidification may be carried out by using coolants such as liquid nitrogen or dry ice to cool an apparatus itself, or by mixing these coolants with the wax-like emulsifier and powdery emulsifier so as to allow both the wax-like emulsifier and powdery emulsifier to co-exist. As the mills, there may be used any type of mill such as a screw mill, a rotor speed mill, a hammer mill.

In addition, in the method (2) or (3), the mixture to be pulverized contains various particles having considerably different particle sizes from each other. Therefore, it is preferred that the wax-like emulsifier is previously pulverized and then mixed with the powdery emulsifier using, for example, a V-type mixer, a horizontal cylinder-type mixer, a vertical screw-type mixer. In this case, in order to prevent the wax-like emulsifier and powdery emulsifier from being melted by heat generated upon the preceding pulverization or mixing of both the emulsifiers, it is preferred to take any measure such as cooling of the apparatus used or co-existence of coolants with the emulsifiers. The process for producing the powdered emulsifier composition according to the present invention can be appropriately selected form the above-mentioned methods (1) to (3) depending upon kinds of wax-like emulsifier and powdery emulsifier used or mixing ratios therebetween.

The thus obtained powdered emulsifier composition according to the present invention has such a structure that at least a part of the surface of the powdered emulsifier composition is formed by the powdery emulsifier. Exactly, the powdered emulsifier composition according to the present invention has such a structure that the powdery emulsifier is adhered on the surface of the particle of the wax-like emulsifier and/or a structure that the powdery emulsifier is exposed at the surface of the particle of the powdered emulsifier composition. As a result, the powdered emulsifier composition can be prevented from suffering from blocking (agglomeration), is easy to handle upon weighing and mixing with food, can be kept stable upon storing, and can be dissolved in food at a high speed.

EXAMPLES

The present invention will now be described in more detail with reference to the following examples, but the present invention is not restricted to those examples and various modifications are possible within the scope of the invention.

Reference Example 1

(Production of wax-like diglycerol monopalmitate):

700 g of diglycerol (produced by SAKAMOTO YAKUHIN KOGYO CO., LTD.) and 800 g of palmitic acid were reacted with each other at 250° C. for 2.5 hours in the presence of sodium hydroxide as a catalyst, followed by cooling the resultant reaction product. After removing unreacted diglycerol, the reaction product was subjected to molecular distillation, thereby obtaining 360 g of massive diglycerol fatty acid ester (containing 70% by weight of monoester and 30% by weight of diester). It was confirmed that the obtained ester was melted at a temperature of 60 to 90° C.

Reference Example 2

(Production of wax-like decaglycerol stearate):

800 g of decaglycerol (produced by SAKAMOTO YAKUHIN KOGYO CO., LTD.) and 700 g of stearic acid were reacted with each other at 240° C. for 3 hours in the presence of sodium hydroxide as a catalyst and further reacted at 260° C. for 4 hours, followed by cooling the resultant reaction product, thereby obtaining 1,450 g of massive decaglycerol stearate.

Example 1

50 parts by weight of the massive diglycerol fatty acid monoester obtained in Reference Example 1 and 50 parts by weight of sucrose fatty acid ester as a powdery emulsifier (trade name: "RYUTO SUGAR ESTER S-570", produced by MITSUBISHI-KAGAKU FOODS CORPORATION; fatty acid used: a mixture of 70% stearic acid and 30% palmitic acid; esterification percentage: 26%; melting temperature: 45 to 70° C.) were heated at 90° C. to melt and mix these emulsifiers together. Thereafter, the resultant mixture was allowed to stand at room temperature for cooling and solidification thereof. The obtained solid was cut into lumps of 2 cm cube, charged into a screw mill and pulverized therein, thereby obtaining a powdered emulsifier composition having a particle size of 50 to 200 µm. The content of the screw mill was observed during the pulverization.

After the pulverization, the obtained powdered composition was filled in a polyethylene bag, and allowed to stand at room temperature (25° C.) for one day and one month. Thereafter, the condition of the powdered composition in the polyethylene bag was observed. The results are shown in Table 1.

Examples 2 and 3 and Comparative Example 1

The same procedure as defined in Example 1 was conducted except that "RYUTO SUGAR ESTER B-370" (trade name, produced by MITSUBISHI-KAGAKU FOODS CORPORATION; fatty acid used: a mixture of 70% behenic acid and 30% other fatty acids; esterification percentage: 33%; melting temperature: 45 to 70° C.), glycine (produced by YUKI GOSEI KOGYO CO., LTD.; decomposition temperature: 202 to 236° C.) and sodium caseinate (trade name: "SUNLACT S-12", produced by TAIYO KAGAKU CO., LTD.; decomposition temperature: not less than 250° C.) were used as powdery emulsifiers, respectively (Examples 2 and 3), and no powdery emulsifier was used (Comparative Example 1), thereby obtaining powdered emulsifier compositions. The thus obtained compositions were evaluated in the same manner as in Example 1. The results are shown in Table 1.

Example 4

The same procedure as defined in Example 1 was conducted except that the wax-like emulsifier obtained in Reference Example 2 was used, thereby obtaining a powdered emulsifier composition. The thus obtained composition was evaluated in the same manner as in Example 1. The results are shown in Table 1.

TABLE 1

| Examples and Comparative Examples | Wax-like emulsifier used (50 parts by weight) | Powdery emulsifier used (50 parts by weight) | Shape |
|---|---|---|---|
| Example 1 | Emulsifier obtained in Reference Example 1 | S-570 | Powder (50 to 200 µm) |
| Example 2 | Emulsifier obtained in Reference Example 1 | B-370 | Powder (50 to 200 µm) |
| Example 3 | Emulsifier obtained in Reference Example 1 | Glycine | Powder (50 to 200 µm) |
| Comparative Example 1 | Emulsifier obtained in Reference Example 1 | None | Massive |
| Example 4 | Emulsifier obtained in Reference Example 2 | S-570 | Powder (50 to 200 µm) |

| Examples and Comparative Examples | Evaluation of condition of powder | | |
|---|---|---|---|
| | Upon pulverization | After one day | After one month |
| Example 1 | ⊚ | ⊚ | ⊚ |
| Example 2 | ⊚ | ⊚ | ⊚ |
| Example 3 | ○ | ○ | ○ |
| Comparative Example 1 | X | X | X |
| Example 4 | ⊚ | ⊚ | ⊚ |

(Note) ⊚: completely dried in feeling of free-flowing.
○: dried but rather deficient in feeling of free-flowing
X: melted upon pulverization or solidified upon storage

Examples 5 to 7 and Comparative Example 2

50 parts by weight of the massive diglycerol fatty acid monoester obtained in Reference Example 1 and 50 parts by weight of each of the powdery emulsifiers shown in Table 2 were charged into a mill, mixed together and pulverized at 25° C. without controlling the temperature. The resultant mixture was further pulverized in a screw mill, thereby obtaining powdered emulsifier compositions. The content of the mill was observed during the pulverizing step.

After the pulverization, each of the obtained powdered compositions was filled in a polyethylene bag, and allowed to stand at room temperature for one day and one month. Thereafter, the condition of each powdered composition in the polyethylene bag was observed. The results are shown in Table 2.

TABLE 2

| Examples and Comparative Examples | Powdery emulsifier | Shape of emulsifier composition | Condition of pulverization | After one day | After one month |
|---|---|---|---|---|---|
| Example 5 | S-570 | Powder (50 to 200 µm) | ⊚ | ⊚ | ⊚ |
| Example 6 | B-370 | Powder (50 to 200 µm) | ⊚ | ⊚ | ⊚ |

TABLE 2-continued

| Examples and Comparative Examples | Powdery emulsifier | Shape of emulsifier composition | Condition of pulveri-zation | After one day | After one month |
|---|---|---|---|---|---|
| Example 7 | Glycine | Powder (50 to 200 μm) | ◎ | ○ | ○ |
| Comparative Example 2 | None | Massive | X | X | X |

(Note) ◎: completely dried in feeling of free-flowing.
○: dried but rather deficient in feeling free-flowing
X: melted upon pulverization or solidified upon storage

Examples 8 to 11 and Comparative Example 3

40 parts by weight of the massive diglycerol fatty acid monoester obtained in Reference Example 1, 40 parts by weight of each of the powdery emulsifiers shown in Table 3 and 20 parts by weight of dry ice were mixed together and pulverized under a low-temperature condition (−10° C.). The resultant mixture was further pulverized in a screw mill, thereby obtaining powdered emulsifier compositions. The content of the mill was observed during the pulverizing step.

After the pulverization, each of the obtained powdered compositions was filled in a polyethylene bag, and allowed to stand at room temperature for one day and one month. Thereafter, the condition of each powdered composition in the polyethylene bag was observed. The results are shown in Table 3.

TABLE 3

| Examples and Comparative Examples | Powdery emulsifier | Condition of pulverization | After one day | After one month |
|---|---|---|---|---|
| Example 8 | S-570 | ◎ (50 to 200 μm) | ◎ | ◎ |
| Example 9 | B-370 | ◎ (50 to 200 μm) | ◎ | ◎ |
| Example 10 | Glycine | ◎ (50 to 200 μm) | ○ | ○ |
| Example 11 | Sodium caseinate | ◎ (50 to 200 μm) | ○ | ○ |
| Comparative Example 3 | None | ◎ (50 to 200 μm) | X | X |

(Note) ◎: completely dried in feeling of free-flowing.
○: dried but rather deficient in feeling of free-flowing
X: melted upon pulverization or solidified upon storage

Examples 12 to 14 and Comparative Example 4

The same procedure as defined in Example 1 was conducted except that the mixing ratio between the wax-like emulsifier obtained in Reference Example 1 and "RYUTO SUGAR ESTER S-570" as a powdery emulsifier was varied as shown in Table 4, thereby obtaining powdered emulsifier compositions. Each of the thus obtained compositions was stored and evaluated in the same manner as in Example 1. The results are shown in Table 4.

TABLE 4

| Examples and Comparative Examples | Wax-like emulsifier | Shape of emulsifier composition | Condition of pulveri-zation (shape) | After one day | After one month |
|---|---|---|---|---|---|
| Example 11 | 10 | 90 | ◎ Powder | ◎ | ◎ |
| Example 13 | 40 | 60 | ◎ Powder | ◎ | ◎ |
| Example 14 | 80 | 20 | ◎ Powder | ◎ | ○ |
| Comparative Example 6 | 95 | 5 | X Massive | X (mass) | X (mass) |

(Note) ◎: completely dried in feeling of free-flowing.
○: dried but rather deficient in feeling of free-flowing
X: melted upon pulverization or solidified upon storage

What is claimed is:

1. A powdered emulsifier composition comprising 5 to 90% by weight of polyglycerol fatty acid ester and 95 to 10% by weight of a powdery emulsifier which is kept in a dry state at ordinary temperature, is prevented from being melted or decomposed when heated at a temperature of not more than 45° C. and has a particle size of 10 um to 5 mm; and said composition having such a structure that a part of the particle's surface of the powdered composition is formed by the powdery emulsifier.

2. A powdered emulsifier composition according to claim 1, wherein said powdery emulsifier is selected from the group consisting of sucrose fatty acid esters, sorbitan fatty acid esters, casein, sodium caseinate and glycine.

3. A process for producing a powdered emulsifier composition according to claim 1, comprising:

melting and mixing said polyglycerol fatty acid ester and said powdery emulsifier, followed by cooling and solidifying the obtained mixture; and pulverizing the solidified mixture.

4. A process for producing a powdered emulsifier composition according to claim 1, comprising:

mixing said polyglycerol fatty acid ester with said powdery emulsifier at a temperature of not more than 40C at which both the polyglycerol fatty acid ester and powdery emulsifier are kept in a solid state; and pulverizing the obtained mixture.

5. A powdered emulsifier composition according to claim 1, wherein said composition consists essentially of 10 to 80% by weight of polyglycerol fatty acid ester and 90 to 20% by weight of powdery emulsifier.

6. A powdered emulsifier composition according to claim 1, wherein said composition consists essentially of 40 to 70% by weight of polyglycerol fatty acid ester and 60 to 30% by weight of powdery emulsifier.

* * * * *